United States Patent
Lee et al.

(10) Patent No.: US 7,929,906 B2
(45) Date of Patent: Apr. 19, 2011

(54) FORWARD AND REVERSE LINK AUTOMATIC POWER CONTROLLED REPEATER AND METHOD

(75) Inventors: Seong Jae Lee, Seoul (KR); Doo Young Moon, Seoul (KR); Mi Ja Lee, Gyeonggi-do (KR); Jae Woong Koo, Seoul (KR)

(73) Assignee: RF Window Co., Ltd., Seoul (KR)

( * ) Notice: Subject to any disclaimer, the term of this patent is extended or adjusted under 35 U.S.C. 154(b) by 686 days.

(21) Appl. No.: 11/943,694

(22) Filed: Nov. 21, 2007

(65) Prior Publication Data

US 2008/0064354 A1    Mar. 13, 2008

Related U.S. Application Data

(63) Continuation of application No. PCT/KR2006/001406, filed on Apr. 17, 2006.

(30) Foreign Application Priority Data

Mar. 29, 2006   (KR) .................. 10-2006-0028412

(51) Int. Cl.
*H04B 3/36* (2006.01)
(52) U.S. Cl. ..................................... 455/7; 370/315
(58) Field of Classification Search ............. 455/7–11.1, 455/14–25; 370/315
See application file for complete search history.

(56) References Cited

U.S. PATENT DOCUMENTS

| | | | | |
|---|---|---|---|---|
| 6,571,284 | B1* | 5/2003 | Suonvieri | 709/221 |
| 7,027,420 | B2* | 4/2006 | Hamalainen | 370/335 |
| 7,062,224 | B2* | 6/2006 | Baker et al. | 455/9 |
| 7,428,424 | B2* | 9/2008 | Hwang et al. | 455/522 |
| 7,519,356 | B2* | 4/2009 | Miyake et al. | 455/415 |
| 2002/0045431 | A1 | 4/2002 | Bongfeldt | |
| 2003/0123401 | A1 | 7/2003 | Dean | |
| 2006/0166618 | A1* | 7/2006 | Bakaimis | 455/11.1 |

FOREIGN PATENT DOCUMENTS

KR   1020000043964 A   7/2000
KR   1020030070927 A   9/2003

* cited by examiner

*Primary Examiner* — Raymond S Dean
(74) *Attorney, Agent, or Firm* — Laurence A. Greenberg; Werner H. Stemer; Ralph E. Locher

(57) ABSTRACT

A forward and reverse link automatic power controlled repeater in an apparatus for measuring a path loss between a base-station and a repeater, includes a repeater control part device for controlling a repeater run and for processing forward and reverse gain of the repeater using received information. A mobile communication modem device transfers base-station signal information and base-station power transmission, and provides a wireless connection pathway of the repeater control part. A repeater element management system (EMS) device transfers information extracted from the base-station to the repeater control part and exchanges information with the repeater control part to control a repeater through the modem.

9 Claims, 5 Drawing Sheets

US 7,929,906 B2

FORWARD AND REVERSE LINK AUTOMATIC POWER CONTROLLED REPEATER AND METHOD

CROSS-REFERENCE TO RELATED APPLICATION

This application is a continuation of copending International Application No. PCT/KR2006/001406, filed Apr. 17, 2006, which designated the United States; this application also claims the priority, under 35 USC §119, of Korean Patent Application No. 10-20060028412, filed Mar. 29, 2006; the prior applications are herewith incorporated by reference in their entirety.

BACKGROUND OF THE INVENTION

1. Field of the Invention

The present invention relates to a method of measuring actual path loss between base-station and a repeater in a wireless communication network.

2. Description of the Related Art

Generally, a base-station assuming the role of providing a service and a user-station using a service of the base-station have existed basically in a wireless communication network system, and a repeater is set up to provide a signal amplification function for efficiency of an equipment installation and a signal transmission between a mobile-station or the base-station and the user-station.

In addition, the communication quality of a mobile-station in a communication network system depends on the quality of radio waves to be received by a mobile-station, for instance the communication quality depends on a reception power of a signal that a mobile-station receives, especially the communication quality in a mobile communication system of with digital code division multiple access.

As mentioned-above, for optimizing a communication environment of a wireless communication network, a prior art method set up a repeater gain with analysis of a path loss by an operator that confirmed an output of a base-station and measured the power of a reception signal in a repeater. However, a path loss between a base-station and a repeater according to the method had a problem which was that there was no way to be able to understand a path loss exactly because it changed due to a power alteration of the base-station and an environment change of the base-station.

BRIEF SUMMARY OF THE INVENTION

The present invention is provided for overcoming the above-mentioned problem in such a way as to be put to practical use as a stable application and a capacity improvement of a base-station with automatic control of forward and reverse gain of a repeater for exactly measuring a path loss between a base-station and a repeater.

An object of the present invention for overcoming the above-mentioned problem is to provide a method to be able to measure exactly a path loss between a base-station and a repeater.

The above-mentioned, forward and reverse link automatic power control repeater system according to the present invention has the effect of being able to provide an efficiency of application and capacity improvement of a base-station because it controls a repeater automatically in real-time to analyze exactly a path loss between a base-station and a repeater by base-station traffic or an environment change.

Moreover, in a forward and reverse link automatic power control repeater system according to the present invention, a repeater element management system for power transmission of a base-station, has the effect of overcoming a customer's dissatisfaction and improving service quality through speedy fault processing, pre-recognition of a repeater fault, and remote monitoring of a repeater to provide a monitoring and controlling function of a repeater.

In addition, the present invention has the advantages that a change in amount of an actual path loss can be known in real-time because a final measurement value of a path loss is to be most closely matched in actual value in real-time, and reliability and quality are superior regarding the path loss measurement value if a measurement duration for the path loss measurement is as long as possible.

The present invention will become better understood with reference to the accompanying drawings which are provided only by way of illustration and thus are not limitative of the present invention.

DETAILED DESCRIPTION OF THE INVENTION

Figure 1:
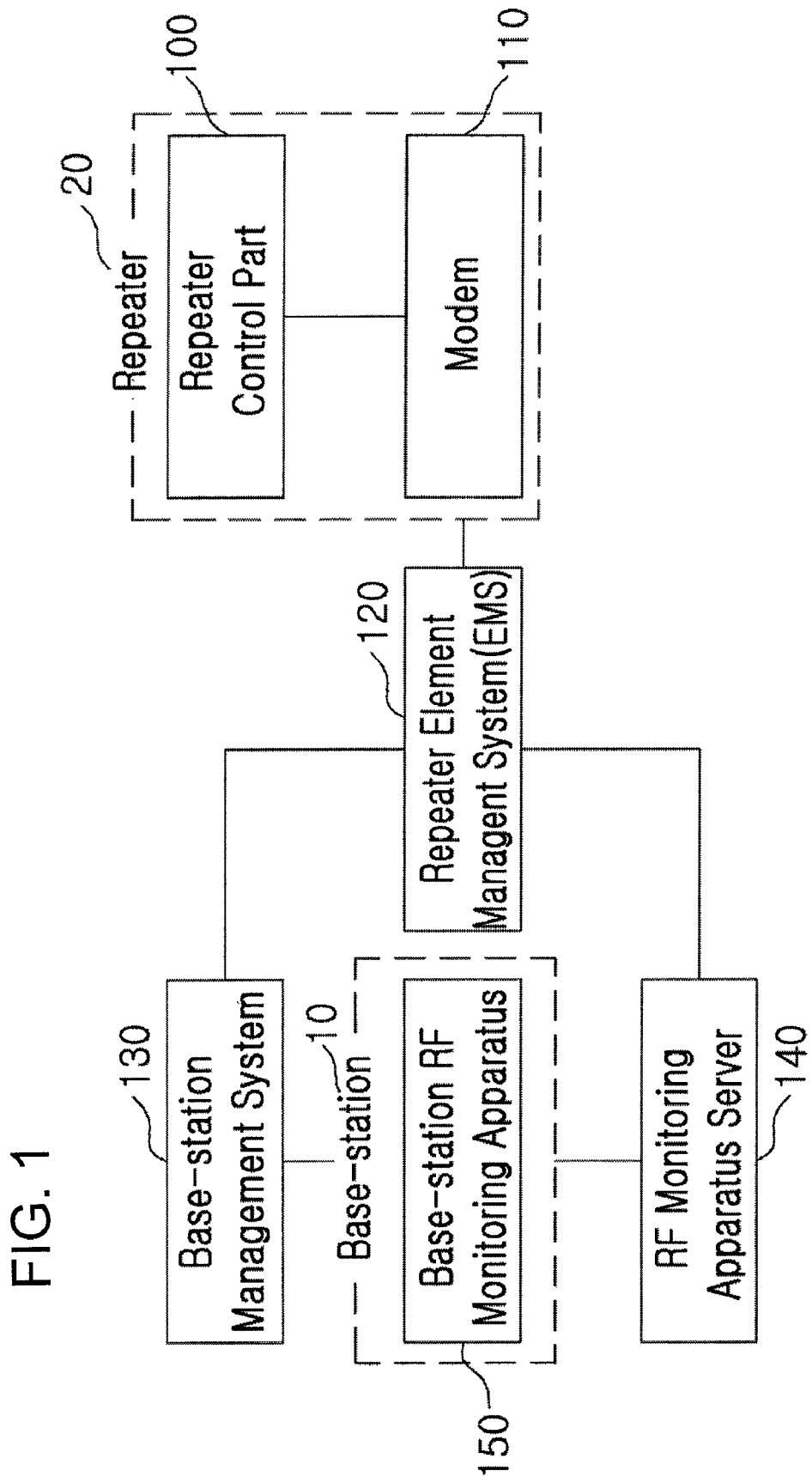
FIG. 1 is a block diagram showing an entire configuration of a forward and reverse link automatic power control repeater system according to the present invention.

In order to achieve the above-mentioned object, in a system for automatically setting up forward and reverse gain of a repeater as a measuring path loss between a base-station and a repeater, the present invention relates to a forward and reverse link automatically controlled repeater system that comprises:

repeater control part means for controlling the repeater run and for processing forward and reverse gain of a repeater using received information;

mobile communication modem means for transferring signal information of a base-station and power transmission of a base-station, and providing a wireless connecting path way of the repeater control part;

a repeater element management system for transferring information extracted from a base-station to the repeater control part and for exchanging information with the repeater control part to control a repeater through the modem;

a base-station management system for transferring request information to the repeater element management system upon receiving a request for needed information from the repeater element management system, and for managing a base-station parameter, configuration, status, and power transmission to connect with the repeater element management system;

an RF (radio frequency) monitoring server for transferring request information to the repeater element management system upon receiving a request for needed information from the repeater element management system, and for managing a mobile-phone being installed in a base-station and connecting with the repeater element management system; and RF (radio frequency) monitoring apparatus means to be set up in a base-station for monitoring RF waves and power, and links with the RF monitor server.

Moreover, in a method for automatically setting up forward and reverse gain of a repeater to measure a path loss between a base-station and a repeater, the present invention relates to a forward and reverse automatic power controlled method that comprises:

a step 1 which transmits base-station information of a base-station parameter, configuration, status, and power transmission in a base-station management system;

a step 2 which transmits base-station information as RF waves and power from an RF monitoring apparatus server through an RF monitoring apparatus server;

a step 3 which extracts power transmission information of the base-station transmitted from step 1 or step 2 in a repeater element management system;

a step 4 which transmits the power transmission information of the base-station extracted from step 3;

a step 5 which transmits the base-station power transmission from step 4 to a repeater control part received in a modem;

a step 6 which analyzes and measures power reception about the base-station power transmission from step 4 in a repeater control part;

a step 7 which computes a path loss between a base-station and a repeater in a repeater control part based on analyzed information from step 5 and step 6; and a step 8 which sets up forward and reverse gain of a repeater to analyze a computed path loss from step 7.

The present invention relating to a forward and reverse link automatic power controlled repeater and a method for achievement of the above-mentioned objects will be described in detail hereinafter.

FIG. 1 is a block diagram showing an entire configuration of a forward and reverse link automatic power control repeater system according to the prior art.

As shown in FIG. 1, embodiments of a system for automatically setting up a forward and reverse gain with analysis path loss between a base-station and a repeater are as follows:

a repeater control part (100) to process a forward and reverse gain of a repeater (20) for increasing system capacity of a base-station (10) using received information, a repeater element management system (EMS) (120) to manage the repeater (20), an RF monitoring apparatus server (140) to measure a power transmission, an RF wave, and an RF power of the base-station (10), an RF monitoring apparatus server (150) to link with the RF monitoring apparatus server (140), a base-station management system (130) to manage a measurement parameter, configuration, status, power transmission of the base-station (10).

In addition, a repeater EMS (Element Management System) (120) using a wireless mobile communication network including all mobile communication forms such as CDMA (Code Division Multiple Access), WCDMA (Wideband Code Division Multiple Access), GSM (Global System for Mobile communication), TSCDMA (TS Code Division Multiple Access), etc., and a modem (110) to transmit wireless signals of all mobile communication forms and the base-station power transmission to the repeater control part (100).

Now, a correlation of a repeater control part (100) to control a repeater (20) about each configuration of the forward and reverse link automatic power controlled repeater system, a modem (110) to be installed in the repeater (20), a repeater element management system (EMS) (120), and an RF monitoring apparatus (150) and an RF monitoring apparatus server (140) to keep watch of the base-station RF status will be described in detail hereinafter.

The repeater control part (100) is used to process forward and reverse gain of the repeater (20) for increasing a system capacity of the base-station (10) using received information and control a function of the repeater (20), which exchanges information as needed with the repeater EMS (120) through the modem (110) which is inside of the repeater (20) as a control function of the repeater, and also plays a role to extract necessary information by request or periodically with the modem (110) from the base-station.

The modem (110) to be connected with the repeater control part (100) installed in the repeater (20), has a mobile communication function, and transmits pilot signal information and powerful, base-station signal information, power transmission and power reception information of the base-station to the repeater control part (100), and also plays a role to provide a wireless connection path of the repeater EMS and the repeater control part (100).

The repeater element management system (EMS) (120) plays a role to transmit base-station power transmission information from the RF monitoring apparatus server (140) or the base-station management system (130) to the repeater control part (100).

The repeater EMS (120) keeps watch over the status of each type of registered repeater, and provides a monitoring function of a segmented POST, enterprise and maintenance for an entire region, and also provides a detailed monitoring function of a repeater status such as a repeater version, model name and version, manufacturer and capacity, etc.

Moreover, the repeater EMS (120) is able to control a repeater with an operator in a remote location based on a repeater's status, and also after a change of a corresponding value of a selected repeater, then transmits to the selected repeater, and then stores a control history of the repeater in a database.

The base-station management system (130) is a system used to manage a parameter and configuration information of a base-station, status information, and a base power transmission, which plays a role in transmitting requested information to the repeater EMS (120) if necessary information is requested from the repeater EMS (120).

The RF monitoring apparatus server (140) is a system used to manage an RF monitoring apparatus (150) to be installed in each base-station (10), which plays a role in transmitting requested information to the repeater EMS (120) if necessary information is requested such as RF wave and power, and base-station power transmission from the repeater EMS (120).

The RF monitoring apparatus (150) is installed in the base-station (10), and operates to link with the RF monitoring apparatus server (140) such as a mobile phone for monitoring RF waves and power.

Figure 2:
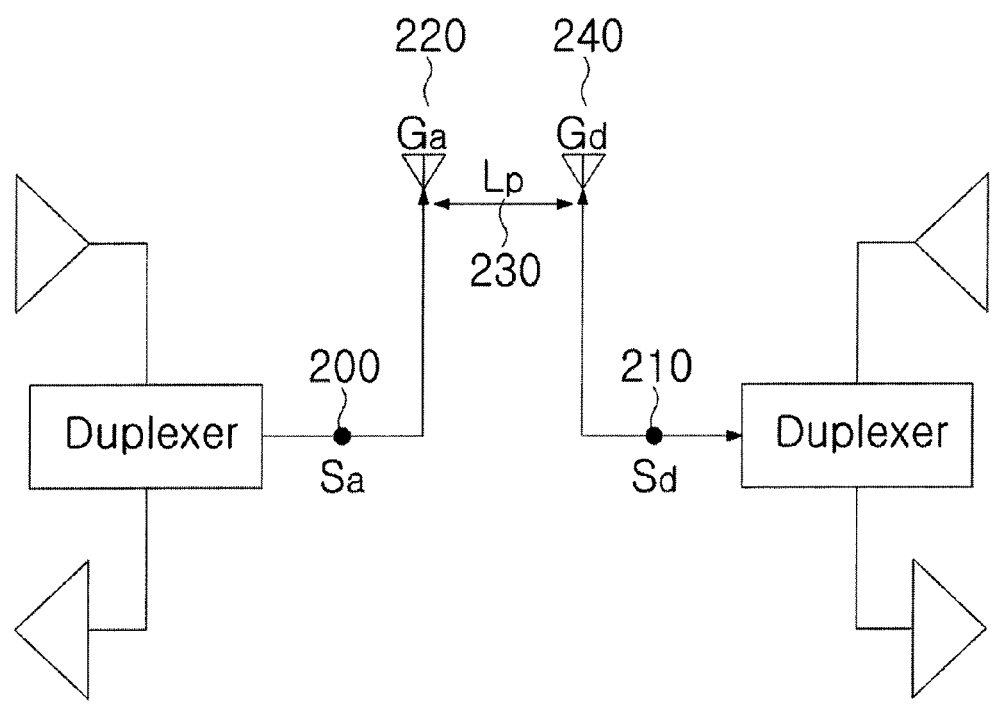
FIG. 2 is a circuit diagram showing a definition of a path loss between a base-station and a repeater according to the present invention.

FIG. 2 is a circuit diagram showing a definition of a path loss between a base-station and a repeater according to the prior art.

As is shown in FIG. 2, generally a path loss is used to determine a wireless interval between two points (Lp). However, the path loss of the present invention represents a gap of a base-station power transmission ($S_a$) (200) and a repeater power reception ($S_d$) (210) including antenna gain and feeder loss, and the repeater power reception ($S_d$) (210) represents an addition of all base-station power transmission ($S_a$) (200), base-station antenna gain ($G_a$) (220), two points' loss (Lp) (230) in a wireless interval and a repeater antenna gain ($G_d$) (240), for instance 40 dB of a base-station power transmission (Sa), 18 dB of a base-station antenna gain ($G_a$), −100 dB of two points loss (Lp) in a wireless interval, and 18 dB of a repeater antenna gain ($G_d$). The repeater power reception ($S_d$) is represented as follows:

$$\begin{aligned} S_d &= S_a G_a L_p G_d \\ &= 40 \text{ (dB)} + 18 \text{ (dB)} - 100 \text{ (dB)} + 18 \text{ (dB)} \\ &= -24 \text{ (dB)} \end{aligned}$$

Thus, a path loss is 68 dB (base-station power transmission ($S_a$)-repeater power reception ($S_d$)) as calculated by the formula of the represent invention.

Therefore, a path loss for applying the repeater system calculation is used to analyze only the base-station power transmission ($S_a$) (200) and the repeater power reception ($S_d$) (210), but do not need to separately analyze a path loss in a wireless interval.

Figure 3:
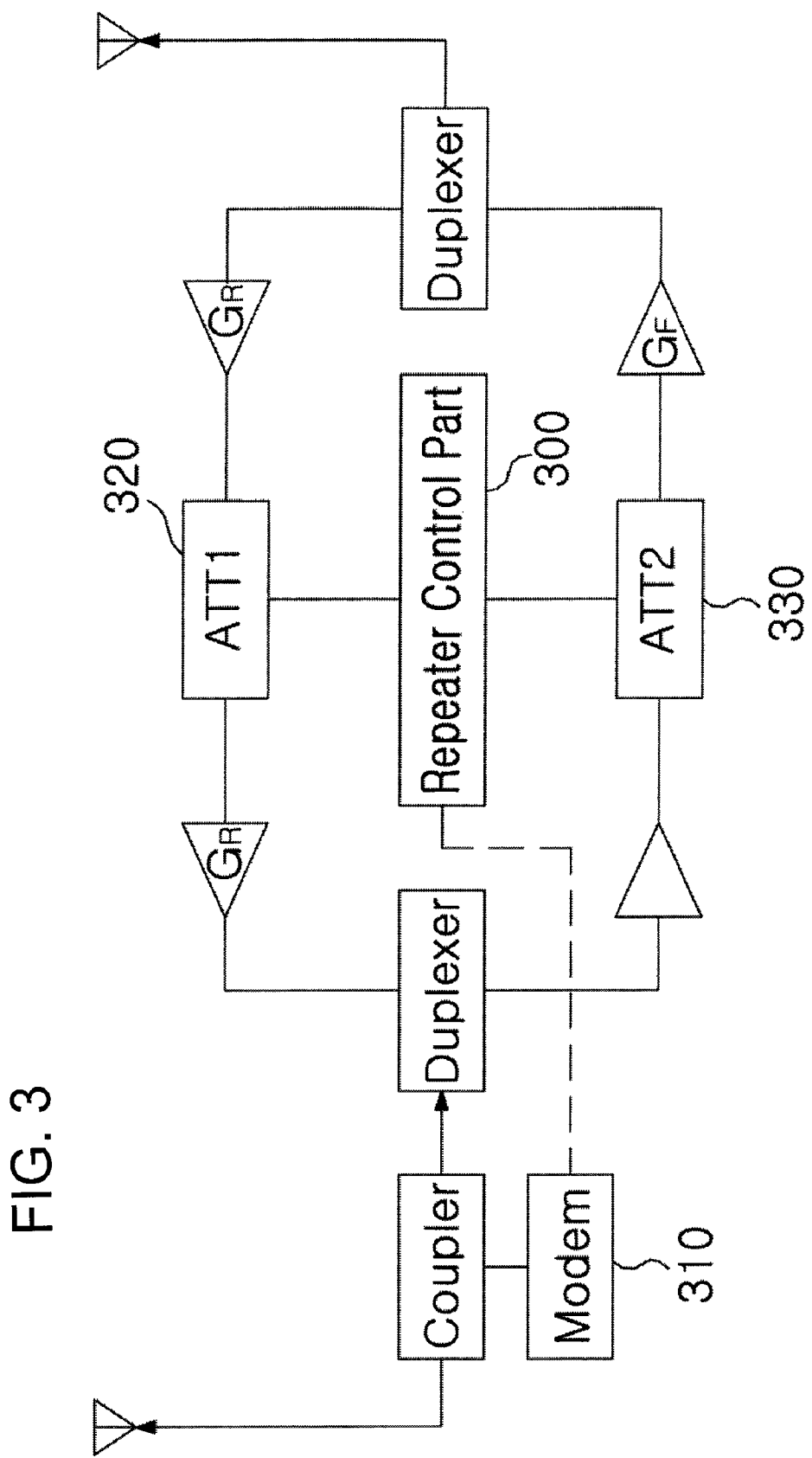
FIG. 3 is a circuit diagram for use inside of a repeater using a path loss according to the present invention.

FIG. 3 is a circuit diagram for use inside of a repeater using a path loss according to the present invention.

As FIG. 3 shows, a base-station power transmission transmitted in a repeater EMS transmits a repeater control part (300) in a modem (310), and the repeater control part (300) controls a gain so that base-station noise is not increased through attenuation in an attenuator ATT 1 (320) of a reverse signal to be transmitted to the base-station, which analyzes a path loss based on measured power reception in the repeater control part (300) and received power transmission, forwards a signal to be transmitted through a station and controls a gain to regularly keep a repeater output through an attenuator ATT 2 (330).

Figure 4:
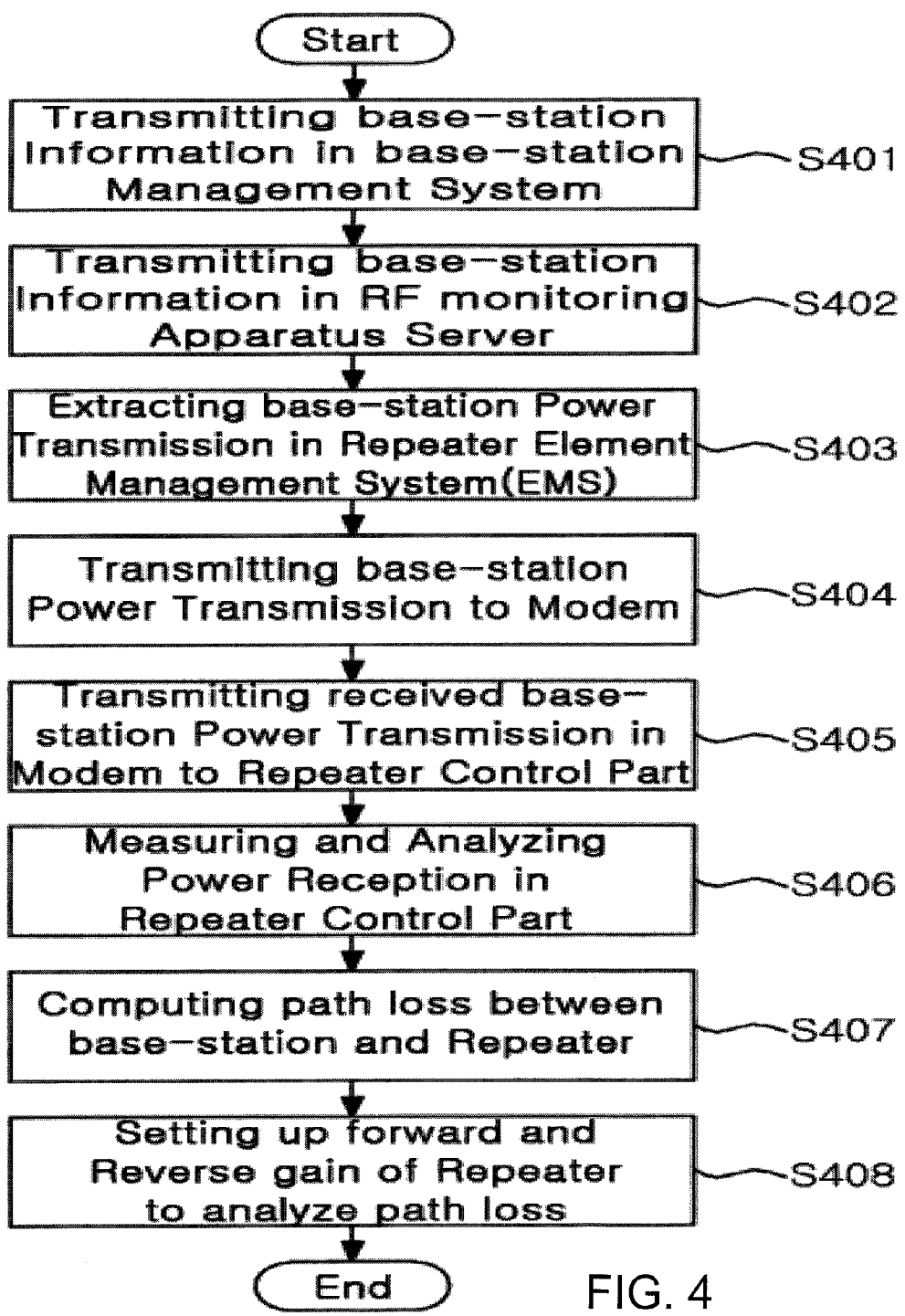
FIG. 4 is a flow chart showing a forward and reverse link automatic power control method with analysis of a path loss according to the present invention.

FIG. 4 is a flow chart showing a forward and reverse link automatic power control method with an analysis path loss according to the present invention.

FIG. 4 includes the steps of, transmitting (S401) base-station information such as configuration, status, and parameter of a base-station, and transmitting (S402) base-station information of RF waves, power, etc. from an RF monitoring apparatus through an RF monitoring apparatus server.

In addition, in an extracting step (S403) power transmission information of the base-station in a repeater EMS is transmitted from the RF monitoring apparatus server or the base-station management system, and in a transmitting step (S404) power transmission information extracted from the base-station is transmitted to a modem. The base-station power transmission represents the entire output including control channel and traffic channel of each base-station.

Moreover, a transmitting step (S405) transmits a base-station power transmission in the modem to a repeater control part, and an analyzing step (S406) is used to measure power reception in the transmitted base-station power transmission.

Finally, in a computing step (S407) a path loss between the base-station and the repeater in the repeater control part is based on the analyzed information, and the path loss is subtracted as a power reception value from the base-station power transmission, and in a set up step (S408) forward and reverse gain of a repeater are used to analyze the computed path loss.

Figure 5:
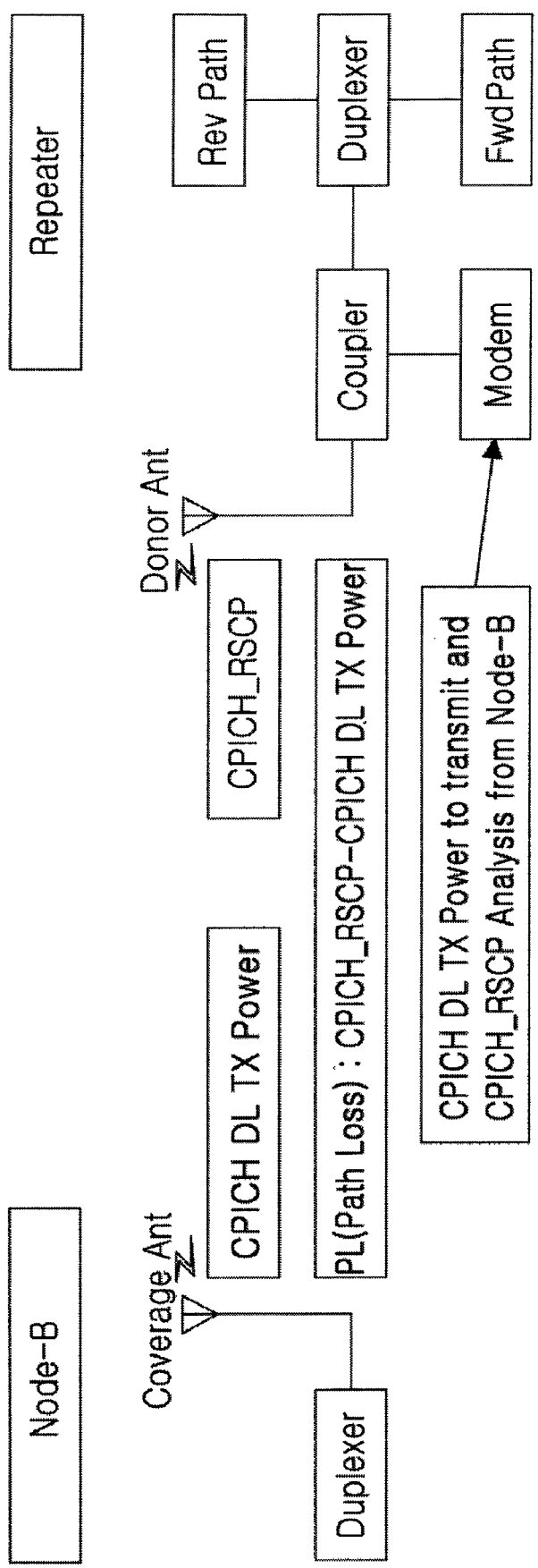
FIG. 5 is a block diagram showing a measurement method for a path loss between a base-station and a repeater using a modem to be set up in a repeater of a WCDMA network (Wideband Code Division Multiple Access) according to the present invention.

FIG. 5 is a block diagram showing a measurement method for a path loss between a base-station and a repeater using a modem to be set up in a repeater of a WCDMA (Wideband Code Division Multiple Access) network according to the present invention.

As is seen in FIG. 5, a request is made for a base-station control channel power transmission (CPICH DL TX power) to transmit with a coverage antenna to receive and send a signal of a subscriber mobile-phone in a frequency reaching a range of Node-B to a modem, and a transmitted control channel power reception (CPICH_RSCP) is made to a donor antenna to be able to receive and send a signal with a base-station, and the modem analyzes power reception (CPICH_RSCP) to receive a power transmission (CPICH DL TX power) to transmit in the Node-B.

Then, the modem transmits the extracted requested information to the repeater control part, and a path loss between the base-station and the repeater in a wireless interval of the WCDMA system uses a defined formula in 3GPP TS25.331 SPECIFICATION as follows:

PATH LOSS=base-station control channel power transmission(CPICH DL TX power)−control channel power reception(CPICH_RSCP)

The present invention is not limited to the above embodiment. As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. In an apparatus for measuring a path loss between a base-station and a repeater, a forward and reverse link automatic power controlled repeater, comprising:
  repeater control part means for controlling a repeater run and processing forward and reverse gain of the repeater using received information;
  mobile communication modem means for transferring base-station signal information and base-station power transmission and providing a wireless connection pathway of the repeater control part means, said modem means analyzing Common Pilot Channel (CPICH) transmission power and CPICH reception power;
  repeater element management system (EMS) means for transferring information extracted from the base-station to said repeater control part means and for exchanging information with said repeater control part means for controlling a repeater through said modem means;
  base-station management system means for transferring requested information to said repeater element management system (EMS) means upon receiving the requested information as needed from said repeater element management system (EMS) means and managing base-station parameters, configuration, status and power transmission for connection with said repeater element management system (EMS) means;
  RF (radio frequency) monitoring apparatus server means transferring requested information to said repeater element management system (EMS) means upon receiving the requested information as needed from said repeater element management system (EMS) means and managing a mobile-phone installed in a base-station connected with said repeater element management system (EMS) means; and RF (radio frequency) monitoring apparatus means to be set up in a base-base-station for monitoring RF waves and power and for linking with said RF monitor server means.

2. The apparatus according to claim 1, wherein said repeater control part means increases a capacity of a base-station to control forward and reverse gain of the repeater as a measure of a path loss.

3. The apparatus according to claim 1, wherein said modem means provides a wireless connecting pathway for connection between said repeater element management system (EMS) means and said repeater control part means.

4. The apparatus according to claim 1, wherein said repeater element management system (EMS) means transmits base-station power in said base-station management system means and said RF monitoring apparatus server means to said modem means.

5. In an apparatus for measuring a path loss between a base-station and a repeater, a forward and reverse link automatic power controlled repeater, comprising:
   repeater control part means for controlling a repeater run and processing forward and reverse gain of the repeater using received information;
   mobile communication modem means for transferring base-station signal information and base-station power transmission and providing a wireless connection pathway of the repeater control part means;
   repeater element management system (EMS) means for transferring information extracted from the base-station to said repeater control part means and for exchanging information with said repeater control part means for controlling a repeater through said modem means;
   base-station management system means for transferring requested information to said repeater element management system (EMS) means upon receiving the requested information as needed from said repeater element management system (EMS) means and managing base-station parameters, configuration, status and power transmission for connection with said repeater element management system (EMS) means;
   RF (radio frequency) monitoring apparatus server means transferring requested information to said repeater element management system (EMS) means upon receiving the requested information as needed from said repeater element management system (EMS) means and managing a mobile-phone installed in a base-station connected with said repeater element management system (EMS) means; and
   RF (radio frequency) monitoring apparatus means to be set up in a base-base-station for monitoring RF waves and power and for linking with said RF monitor server means;
   said repeater element management system (EMS) means monitoring status in each type of registered repeater, monitoring functions of a group consisting of a POST segmented region, a manufacturer and maintenance, monitoring functions of the repeater in detail to check a repeater version, modem name, manufacturer and capacity and monitoring the repeater as a confirmation in the base-station.

6. The apparatus according to claim 1, wherein said repeater element management system (EMS) means controls the repeater remotely by an operator based on a status of the repeater, transmits to the repeater after changing corresponding values of a selected repeater and controls the repeater to store a control history of the repeater in a database.

7. A method for automatically controlling forward and reverse linking of a repeater in a method for automatically setting up forward and reverse gain of a repeater, the method comprising the following steps:
   a) transmitting base-station information regarding base-station parameters, configuration, status and power transmission in a base-station management system;
   b) transmitting base-station information as RF waves and power from an RF monitoring apparatus through an RF monitoring apparatus server;
   c) extracting power transmission information from the base-station transmitted in step a) or step b) in a repeater element management system (EMS);
   d) transmitting the power transmission information of the base-station extracted in step c);
   e) transmitting the base-station power transmitted in step d) to a repeater control part received in a modem;
   f) analyzing and measuring power reception of the base-station power transmitted in step d) in a repeater control part;
   g) computing a path loss between the base-station and the repeater in a repeater control part based on information analyzed in step e) and step f); and
   h) setting up the forward and reverse gain of the repeater to analyze the path loss computed in step g); and
   i) analyzing, Common Pilot Channel (CPICH) transmission power and CPICH reception power, with the modem.

8. The method according to claim 7, which further comprises carrying out step g) by calculating the path loss between the base-station and the repeater using only a modem in a WCDMA network subtracting a control channel power reception (CPICH_RSCP) from a base-station control channel power transmission (CPICH DL TX power).

9. The method according to claim 8, which further comprises using the modem to analyze the base-station control channel power transmission (CPICH DL TX power) and the control channel power reception (CPICH_RSCP) for transmitting in the base-station.

* * * * *